United States Patent
Ahmad et al.

(10) Patent No.: US 10,251,118 B2
(45) Date of Patent: Apr. 2, 2019

(54) CONNECTION MANAGEMENT BASED ON PRIORITY IN A WIRELESS NETWORK

(71) Applicant: INTERDIGITAL PATENT HOLDINGS, INC., Wilmington, DE (US)

(72) Inventors: Saad Ahmad, Montreal (CA); Amir Helmy, Vancouver (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 15/546,838

(22) PCT Filed: Dec. 31, 2015

(86) PCT No.: PCT/US2015/068294
§ 371 (c)(1),
(2) Date: Jul. 27, 2017

(87) PCT Pub. No.: WO2016/122830
PCT Pub. Date: Aug. 4, 2016

(65) Prior Publication Data
US 2018/0027479 A1 Jan. 25, 2018

Related U.S. Application Data

(60) Provisional application No. 62/110,112, filed on Jan. 30, 2015.

(51) Int. Cl.
*H04W 76/04* (2009.01)
*H04W 48/06* (2009.01)
*H04W 48/12* (2009.01)
*H04W 76/27* (2018.01)
(Continued)

(52) U.S. Cl.
CPC ....... *H04W 48/06* (2013.01); *H04W 28/0289* (2013.01); *H04W 48/12* (2013.01); *H04W 76/27* (2018.02); *H04W 84/042* (2013.01)

(58) Field of Classification Search
CPC . H04W 48/06; H04W 28/0289; H04W 76/27; H04W 48/12; H04W 84/042
See application file for complete search history.

(56) References Cited

U.S. PATENT DOCUMENTS

2010/0120432 A1* 5/2010 Watfa ............... H04W 76/18
455/436
2013/0201870 A1 8/2013 Gupta
(Continued)

OTHER PUBLICATIONS

Huawei et al., "ACB skip for low priority and dual priority UEs," C1-150321, 3GPP TSG-CT WG1 Meeting #90, Sorrento (Italy), (Jan. 20, 2015).

(Continued)

*Primary Examiner* — Jay P Patel
(74) *Attorney, Agent, or Firm* — Volpe and Koenig, P.C.

(57) ABSTRACT

A wireless transmit/receive unit (WTRU) may receive, at a radio resource control (RRC) component from a non-access stratum (NAS) component, an extended service request (ESR). The ESR may indicate a low priority for the WTRU and the ESR may be related to a high priority application. The WTRU may transmit, to a wireless network, a RRC connection request with an establishment cause of mobile-originated (MO) data based on the ESR.

12 Claims, 5 Drawing Sheets

(51) Int. Cl.
*H04W 28/02* (2009.01)
*H04W 84/04* (2009.01)

(56) References Cited

U.S. PATENT DOCUMENTS

| | | | | |
|---|---|---|---|---|
| 2014/0022904 | A1* | 1/2014 | Ahmad | H04W 28/0289 370/235 |
| 2014/0029530 | A1 | 1/2014 | Kim et al. | |
| 2016/0278096 | A1* | 9/2016 | Watfa | H04W 28/0205 |
| 2017/0367058 | A1* | 12/2017 | Pelletier | H04W 56/0045 |

OTHER PUBLICATIONS

Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.4.1 (Dec. 2014).

Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.7.0 (Sep. 2015).

Third Generation Partnership Project, "Technical Specification Group Core Network and Terminals; Mobile radio interface Layer 3 specification; Core network protocols; Stage 3 (Release 13)," 3GPP TS 24.008 V13.0.0 (Dec. 2014).

Third Generation Partnership Project, "Technical Specification Group Core Network and Terminals; Mobile radio interface Layer 3 specification; Core network protocols; Stage 3 (Release 13)," 3GPP TS 24.008 V13.4.0 (Dec. 2015).

CT1, "New WID on CT aspects of Application specific Congestion control for Data Communication (ACDC)," 3GPP TSG CT Meeting #66, CP-140812, Maui, Hawaii, US (Dec. 8-9, 2014).

Huawei et al., "ACB skip for low priority and dual priority UEs," 3GPP TSG-CT WG1 Meeting #90, C1-150322, Sorrento, Italy (Feb. 2-6, 2015).

Huawei et al., "ACB skip for low priority and dual priority UEs," 3GPP TSG-CT WG1 Meeting #90, C1-150514, Sorrento, Italy (Feb. 2-6, 2015).

Intel Corporation, "RRC Connection Establishment for ProSe (Communication and Discovery)," 3GPP TSG-RAN WG2 Meeting #87bis, R2-144163, Shanghai, China (Oct. 6-10, 2014).

Interdigital, "Proper Call Type for service request in ProSe," 3GPP TSG-CT WG1 Meeting #91, C1-151109, Bratislava, Slovakia (Apr. 13-17, 2015).

LG Electronics, "Discussion on UE impacts of ACDC mechanism," 3GPP TSG CT WG1 Meeting #90, C1-150375, Sorrento, Italy (Feb. 2-6, 2015).

Nokia Networks, "Handling of Public Safety UEs," 3GPP TSG CT WG1 Meeting #93, C1-152881, Vancouver, Canada (Aug. 17-21, 2015).

Qualcomm Incorporated, "Possible options for ACDC stage 3 specification," 3GPP TSG CT WG1 Meeting #90, C1-150143, Sorrento, Italy (Feb. 2-6, 2015).

Third Generation Partnership Project, "Technical Specification Group Services and System Aspects; Service accessibility (Release 14)," 3GPP TS 22.011 V14.1.0 (Dec. 2015).

Third Generation Partnership Project, "Technical Specification Group Services and System Aspects; Service accessibility (Release 13)," 3GPP TS 22.011 V13.4.0 (Dec. 2015).

Third Generation Partnership Project, "Technical Specification Group Services and System Aspects; Service accessibility (Release 13)," 3GPP TS 22.011 V13.1.0 (Sep. 2014).

Third Generation Partnership Project, "Technical Specification Group Core Network and Terminals; Non-Access-Stratum (NAS) protocol for Evolved Packet System (EPS); Stage 3 (Release 12)," 3GPP TS 24.301 V12.8.0 (Mar. 2015).

Third Generation Partnership Project, "Technical Specification Group Core Network and Terminals; Non-Access-Stratum (NAS) protocol for Evolved Packet System (EPS); Stage 3 (Release 13)," 3GPP TS 24.301 V13.0.0 (Dec. 2014).

Third Generation Partnership Project, "Technical Specification Group Core Network and Terminals; Non-Access-Stratum (NAS) protocol for Evolved Packet System (EPS); Stage 3 (Release 13)," 3GPP TS 24.301 V13.4.0 (Dec. 2015).

* cited by examiner

CONNECTION MANAGEMENT BASED ON PRIORITY IN A WIRELESS NETWORK

CROSS REFERENCE TO RELATED APPLICATIONS

This application is the U.S. National Stage, under 35 U.S.C. § 371, of International Application No. PCT/US2015/068294 filed Dec. 31, 2015, which claims the benefit of U.S. provisional application No. 62/110,112, filed Jan. 30, 2015, the contents of which are hereby incorporated by reference herein as if fully set forth.

BACKGROUND

Different mechanisms may be used for controlling a wireless transmit/receive unit (WTRU)'s network access when the network is congested. Such mechanisms may include, for example, access class barring (ACB), extended access barring (EAB) and service specific access control (SSAC).

According to ACB, at subscription, one or more access classes may be allocated to a subscriber and stored in the subscriber's universal subscriber identity module (USIM). Regular WTRUs may be randomly assigned an access class (AC) (e.g., from 0-9), but some "special" WTRUs may be assigned a higher priority AC (e.g., 11-15). Access-class-based-barring-information may be broadcast in the system information (SI), for example, which may control the mean access barring time and the percentage of barred accesses. When a WTRU attempts to initiate an access, it may attempt to draw a random number and compare the random number to an ac-BarringFactor, which may be a part of the broadcast AC barring information. If the random number is greater than the ac-BarringFactor, the access may be barred for a period of a calculated mean barring time.

EAB may be targeted for WTRUs that are configured to be subject to EAB control, such as WTRUs that are of lower priority or that are delay-tolerant (e.g., machine-type-communication (MTC) devices). Before initiating an access, the non-access stratum (NAS) may first determine whether the access is subject to EAB control based on at least one criterion, such as a WTRU's roaming category, the nature of the access, or whether the WTRU belongs to a special AC (e.g., 11-15). If the WTRU is determined to be subject to EAB control, the NAS may compare the WTRU's AC with a broadcast EAB barring-bitmap (e.g., where each bit represents the barring-status of an AC, such as AC 0-9). There may be no barring factor or barring time defined in the EAB parameters.

SSAC is based on ACB but may have a different set of dedicated SSAC barring parameters, which may differentiate multi-media telephony (MMTEL)-voice service and MMTEL-video service using a different barring factor and/or barring time. Based on broadcast ssac-barring configurations and a WTRU's AC, the WTRU may determine the real barring parameters and inform the upper service layer. Before initiating the service, the service layer may draw a random number and compare it against the barring parameters to determine whether or not the service is barred.

BRIEF DESCRIPTION OF THE DRAWINGS

A more detailed understanding may be had from the following description, given by way of example in conjunction with the accompanying drawings wherein.

SUMMARY

A wireless transmit/receive unit (WTRU) may include a transceiver and a processor. The WTRU may receive broadcast information that may include at least one control parameter for each of a plurality of service types and/or an associated indication of access barring for each of the plurality service types. The non-access stratum (NAS) layer in the WTRU may send a service access request to the radio resource control (RRC) layer for the application including the service type associated with the application and the priority associated with the application. This service access request may trigger the transmission of the RRC connection request message, for example. If a priority associated with an application is above a predetermined priority threshold, the RRC layer may generate and transmit an RRC connection request message for the application to an eNB. In this case, the WTRU may ignore an indication of access barring for a service type associated with the application when proceeding with the connection request. The service types may be application specific congestion control for data communication (ACDC) categories, for example.

DETAILED DESCRIPTION

Figure 1A:
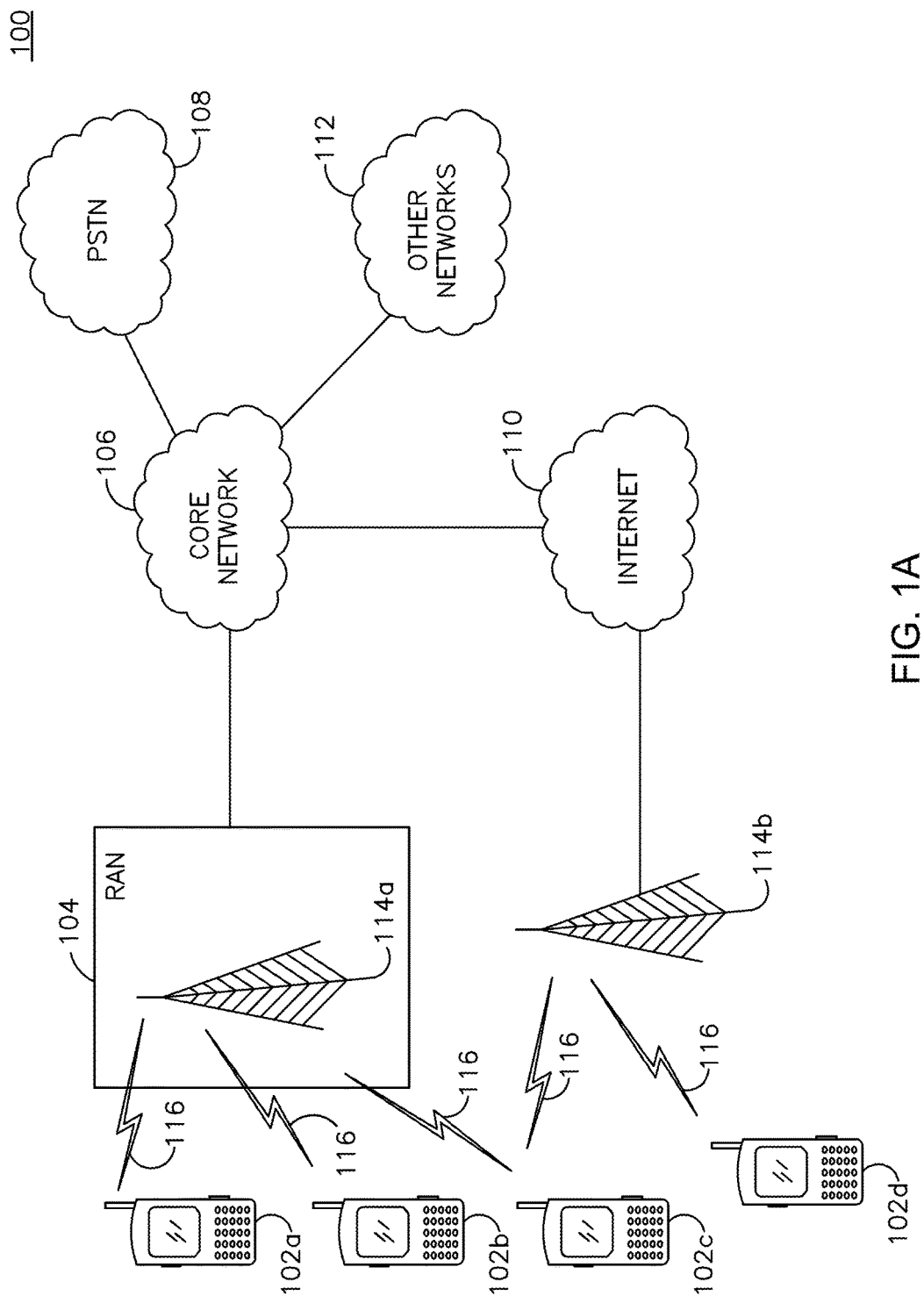
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
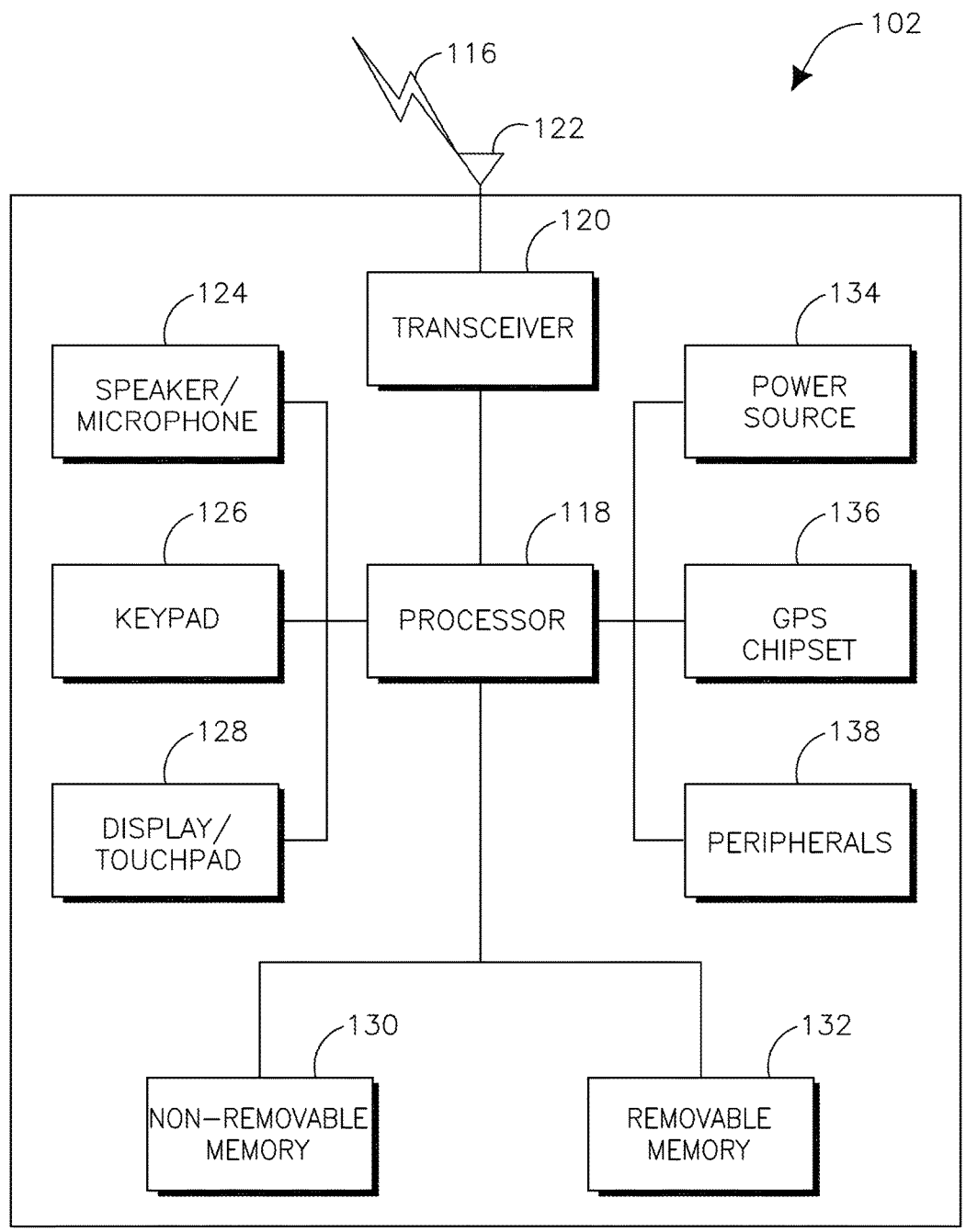
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
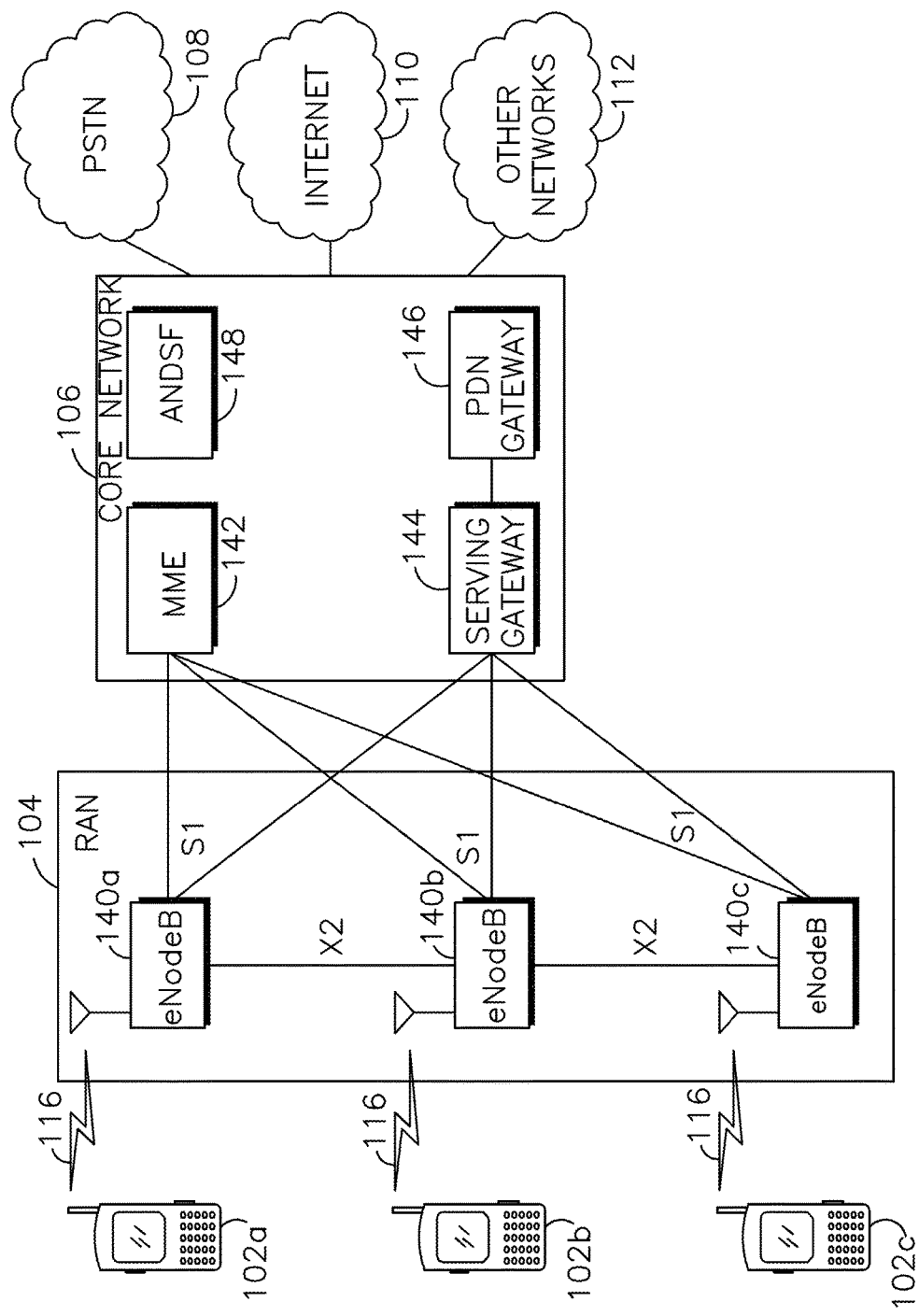
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Application specific congestion control for data communication (ACDC) is an example mechanism that may be used for controlling a WTRU's network access when the network is congested. ACDC may be used to allow and/or prohibit new access attempts to initiate specific applications in associated WTRUs. For example, high priority services or emergency applications, such as disaster message board (DMB), should have network connectivity when disasters occur, even when the network is congested. In ACDC, the prioritization among applications may be accomplished by assigning the different applications to one of a plurality of distinct ACDC categories (e.g., ACDC category 1, ACDC category 2, ACDC category 3 or ACDC category 4), which may be ranked in order of probability of being restricted. A home public land mobile network (HPLMN) may configure the ACDC categories in the WTRU and broadcast control information associated with each category (e.g., barring rate). The configured ACDC categories, along with the control information associated with each category, may control whether or not an access attempt for a certain application may be permitted.

WTRUs that are configured for low access priority may provide the MME with a low access priority indication, for example via the device properties information element (IE) of a NAS request message (e.g., attach request message, packet data network (PDN) connectivity request message, or bearer resource allocation/modification request message). This indication may enable the MME to control and mitigate NAS level mobility management congestion. In particular, in NAS congestion situations, the MME may choose to reject a NAS request message with a back-off timer and, may direct the eNB to reject further RRC connection requests from such low priority WTRUs unless the attempt to access the network is for emergency or high priority services. If, however, a WTRU is performing an emergency attach or is attempting to establish a PDN connection for emergency bearer services (or, for example, performing evolved packet system (EPS) mobility management procedures for an already established PDN connection with emergency bearer services), the WTRU may indicate to the MME in a NAS message that it is not configured for low access priority so that the corresponding RRC and NAS requests may be accepted by the network, even in overload conditions.

If the NAS request message used to establish a new PDN connection includes a low access priority indication, the PDN connection may be associated with low priority (e.g., it may be tied to a default bearer context), and the low priority status may not change until the PDN connection is deactivated. For WTRUs that are configured with permission to override low access priority (i.e., dual priority), the WTRU's upper layers may request initiation of session/mobility management procedures (e.g., establishment of a PDN connection) without low access priority (i.e., no low priority indication may be included in the NAS message) even if the session/mobility back-off timer is already running due to a connection reject message in response to a request with low access priority.

When multiple different access control mechanisms are in use at the same time, interactions between ACDC and other access control mechanisms (e.g., access class barring (ACB), extended access barring (EAB), or service specific access control (SSAC)) may need to be managed. For example, if a low priority MTC device is running an application that belongs to an ACDC category 1 (or the highest priority ACDC category), the MTC device's access attempt may be barred or backed off due to congestion based on its low priority even though the application has a high priority. Here, the low priority WTRU may pass the ACDC check for initial access, but its access attempt is later rejected by the MME due to NAS or APN-based congestion. In this case, even though a certain critical application, such as an emergency application, should be granted access as specified by ACDC rules, the access may be denied in the NAS because the WTRU is a low priority WTRU.

Further, while ACDC, as described above, may be an efficient means of providing access control in the uplink, the situation may be different for downlink transmissions. For example, when a congested network or packet data network gateway (PGW)/serving gateway (SGW) receives a downlink packet destined for a WTRU, the SGW may send a downlink data notification to the MME. In response to receiving the downlink data notification, the MME may page the WTRU to bring it to a connected state. The WTRU may then answer the page and enter a connected mode without checking whether access is allowed for a particular application because the service request for WTRU terminated calls does not differentiate between various types of packet service WTRU terminated calls. Hence, ACDC may not be applied. Nevertheless, for a congested network, such a WTRU-terminated call for a low priority application or an application in a lower ACDC category may unnecessarily add to the congestion level of the network.

For direct device to device (D2D) communication or proximity services (ProSe) communication, a network may need to apply different ACDC rules because a ProSe communication may already be in use to offload some of the network's traffic to reduce congestion in the network. Therefore, conflicting ACDC rules should not be applied to such data traffic or applications. Also, in some cases, the devices may need to check the ACDC rules before establishing an RRC connection.

To address some of the above-described issues with ACDC, according to examples described herein, mechanisms for ACDC may be designed for low priority devices. ACDC may enable operability with other access control mechanisms, provide network control for ACDC in the downlink direction and consider the type of device that is requesting access including low priority devices.

In an example, when a RAN node or an eNB broadcasts ACDC access control parameters (e.g., barring factor, barring time, and/or indication for a roaming WTRU subject to ACDC) for each ACDC category in a system information block (SIB), the RAN node or eNB may also broadcast rule information regarding whether the corresponding ACDC rules are applicable to at least one of delay tolerant devices or low priority MTC devices, for example. Accordingly, low priority devices may be configured to override access-barring that is specific to low priority devices (e.g., ACB, EAB) for indicated ACDC categories.

For example, without such an ACDC override indication for low priority devices, if an ACDC Category 1 (highest priority) application in a low priority device requests network access (e.g., an RRC Connection) when EAB parameters are being broadcast by the eNB/RAN node, the request, may be rejected by the RRC layer in the WTRU. However, using ACDC for low priority devices as described herein, if the RAN node or eNB broadcasts that ACDC Category 1 application requests are allowed to bypass delay tolerant or low priority access controls and override them with ACDC rules, then the RRC layer in a low priority or delay-tolerant WTRU may not reject a request from the NAS layer and may send an RRC connection request to the eNB. An RRC establishment cause may be included in the RRC connection request, and the establishment cause for low priority devices may be Establishment Cause=Delay Tolerant Access, for example. In this scenario, the RRC layer in the WTRU may include a different establishment cause (e.g., Establishment Cause=Mobile-Originated (MO) Data).

Figure 2:
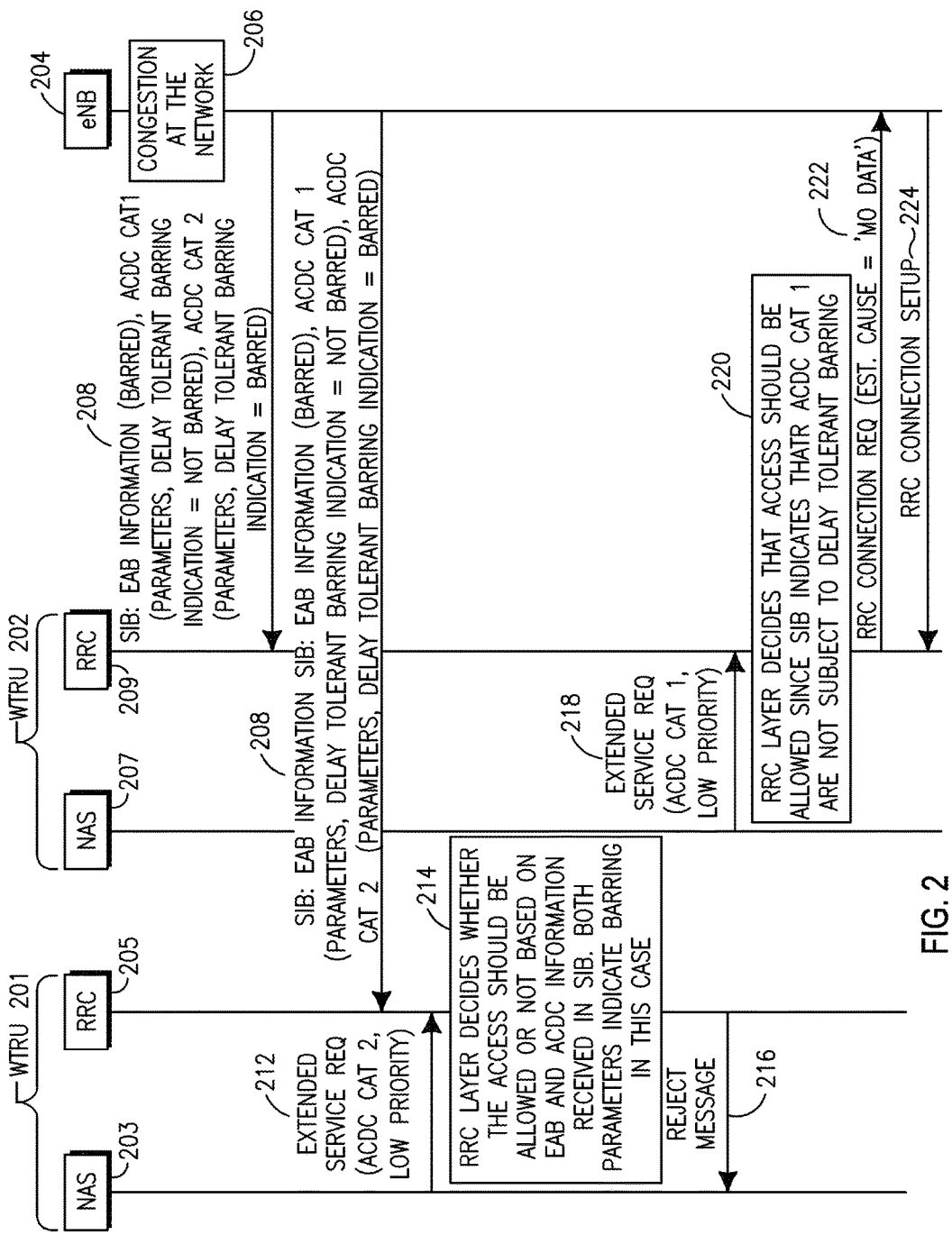
FIG. 2 is a signal diagram of an example method of application specific congestion control for data communication (ACDC) for at least one of low priority or delay-tolerant devices.

FIG. 2 is a signal diagram of an example ACDC procedure 200 for at least one of low priority or delay-tolerant devices. The eNB 204 performs congestion control 206 by controlling WTRU access to the air interface including access by WTRUs 201 and 202. The eNB may provide (e.g. broadcast) SIB broadcast information 208 to WTRUs 202 and 201. In this example, the SIB broadcast information 208 provided to WTRUs 201 and 202 may indicate any of the following information: EAB information indicating access barred information; ACDC parameters and a delay tolerant barring indication=not barred for ACDC category 1; and/or ACDC parameters and a delay tolerant barring indication=barred for ACDC category 2.

In the example ACDC procedure 200, the NAS layer 203 in WTRU 201 may send an extended service request 212 to the RRC layer 205 in WTRU 201, where the extended service request 212 may indicate an ACDC category 2 for a lower priority application, where WTRU 201 may be a low priority device. At 214, the RRC layer 205 of WTRU 201 may decide whether the access should be allowed based on EAB and/or ACDC information received in the SIB broadcast information 208. The RRC layer 205 in WTRU 201 may bar or back off the access by WTRU 201 based on the received SIB broadcast information 208 because WTRU 201 is asking for access for a lower priority application (in this example, ACDC category 2). Accordingly, the RRC layer 205 may send a reject message 216 to the NAS layer 203 to reject the extended service access request 212 by the NAS layer 203.

The NAS layer 207 in WTRU 202 may send an extended service request 218 to the RRC layer 209 in WTRU 202, where the extended service request 212 may indicate an ACDC category 1, which is for a higher priority application, and where WTRU 202 may be a low priority device. At 220, the RRC layer 209 in WTRU 202 may determine and permit access by WTRU 202 based on received SIB broadcast information 208 because WTRU 202 is requesting access for a higher priority application (in this example, ACDC category 1) and the SIB information 208 indicates that low priority access is not barred for ACDC category 1. The RRC layer 205 in WTRU 201 may override AB/EAB parameters and may request an RRC connection by sending an RRC connection request message 222 to the eNB 204 with Establishment Cause=Mobile Originated (MO) Data. The eNB 204 may respond to WTRU 202 by sending a RRC connection setup message 224.

Similarly, if ACDC is applied at an application level similar to the SSAC framework, whenever a particular application is assigned to higher rank ACDC categories, it may be identified and flagged by ACDC rules as an emergency or high priority application. The emergency or high priority flag may then be propagated in the WTRU toward the NAS level such that any NAS request message sent by a WTRU may specifically indicate to the MME in a Request Type IE that the service being requested is emergency or high priority. Setting the priority indicator to WTRU may not be configured for low access priority. If an MME receives a connection request with such an indication, the MME may accept the NAS request and override any low-priority specific access control parameters even though there may be NAS congestion in place.

In accordance with an example of ACDC for the downlink, core network nodes (e.g., MME and/or gateways (GWs)) may be made aware of ACDC application categorization. The ACDC may be configured in the WTRU either via the USIM or as pushed through open mobile alliance (OMA) device management (DM) management object procedures. Hence, the MME may be aware of this categorization either through the WTRU's subscription profile or as per operator based settings in the MME. The MME may be aware of the ACDC categories that are barred by the eNB at a particular time, as well as any specific application barring that may be enabled by operation and maintenance (O&M) procedures. Thus, it may be assumed that the MME is informed of the barring by operator O&M nodes. In another example, the eNB and MME may communicate the barring parameters via S1-AP messaging.

The PGW may provide application information in downlink packets. Such application information may include, for example, but is not limited to include any of the following: an application ID; an application name; an Internet protocol (IP) address of the application flows; and/or some application server identity. This information may be sent to the SGW in a General Packet Radio System (GPRS) Tunneling Protocol User Plane (GTP-U) packet or in a header from the PGW such that the SGW may forward the application information to the MME in the downlink data notification. Based on the ACDC configuration at the MME, the MME may decide to reject the downlink data notification and may apply some paging differentiation policies to decide whether or not to proceed with the network-triggered service request.

For example, if the downlink data notification is for lower ranked ACDC categories (e.g., ACDC Category 3 or ACDC category 4), the MME may reject the downlink data notification; whereas, if the downlink data notification is for a high (or higher) priority application (e.g., ACDC Category 1 or ACDC Category 2), the MME may acknowledge the downlink data notification and proceed with the paging procedure to bring the WTRU to the connected mode for such a downlink application request. In another example, the SGW or PGW may be configured with ACDC parameters, and the SGW or PGW may not send the downlink data to the MME if the downlink data is for barred or for low priority ACDC applications.

In an example of ACDC for ProSe WTRUs, ProSe WTRUs may not be subject to ACDC. A ProSe WTRU may, therefore, send ProSe-specific call types in the service request or extended service request message to the RRC layer in the WTRU. These call types may include, for example, but are not limited to include the following: ProSe Originating Call; and/or ProSe Originating Signaling. These call types may be sent together with the ACDC category indication to the RRC layer in the WTRU.

When the RRC layer receives these call types, it may ignore the received ACDC category from the NAS layer and proceed with requesting the RRC connection from the eNB. For example, an application configured for ACDC category 4 may send a service access request to the system, and the NAS layer in the ProSe WTRU may send a service request indicating the ACDC category (category 4) and the ProSe call type (e.g., ProSe Originating Call). In this example, if the network has barred ACDC category 4, the RRC layer may ignore the ACDC barring for such request because of the ProSe call type and proceed with sending the RRC connection request to the eNB.

In some example scenarios, the network may not want ProSe WTRUs to access the system. In such scenarios, the network or the eNB may indicate via broadcast information (e.g., SIBs) that access for ProSe WTRUs is barred. This information may be sent as a general indication for all ProSe WTRUs and/or may be sent as part of the ACDC parameters specifying whether access for ProSe WTRUs belonging to specific ACDC categories is allowed or not allowed/barred.

According to an example, existing access barring or extended access barring may not be applicable to ProSe WTRUs. If a low priority ProSe WTRU sends a service access request, the RRC layer in the WTRU may not reject the access for extended access barring, or the RRC layer in the eNB may not reject the RRC request for regular access barring. The RRC connection request for the ProSe WTRU may be differentiated from other WTRUs based on the Establishment cause information element (IE) in the RRC connection request. If the network wants to prevent ProSe WTRUs from accessing the system, it may broadcast ProSe-specific access barring parameters. The RRC layer in the WTRU may apply these ProSe-specific parameters if the ProSe call type is included in the service request by the NAS layer.

Figure 3:
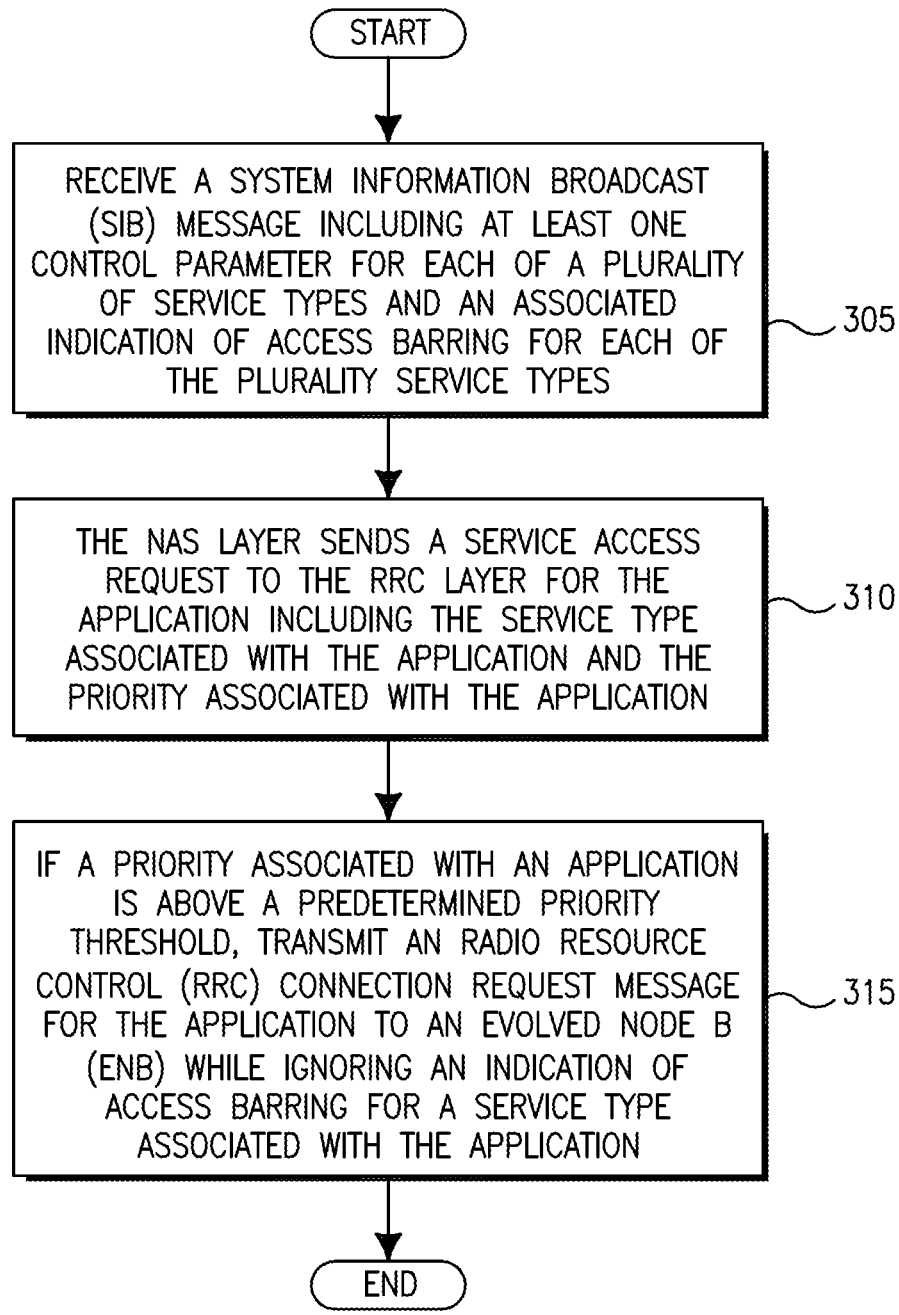
FIG. 3 is a signal diagram of another example method of ACDC.

FIG. 3 is a signal diagram of an example procedure 300 performed by a WTRU. The elements shown in example procedure 300 may be performed independently, and may not be performed together. At 305, the WTRU may receive a SIB message that may include at least one control parameter for each of a plurality of service types and/or an associated indication of access barring for each of the plurality service types. At 310, the NAS layer may send a service access request to the RRC layer for the application including the service type associated with the application and the priority associated with the application. This service access request may trigger the transmission of the RRC connection request message at 305, for example. At 305, on a condition that a priority associated with an application is above a predetermined priority threshold, the RRC layer may generate and transmit an RRC connection request message for the application to an eNB. In this case, the WTRU may ignore an indication of access barring for a service type associated with the application when proceeding with the connection request. The service types may be ACDC categories, for example.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) comprising:
   a processor configured to receive, at a radio resource control (RRC) component from a non-access stratum (NAS) component of the WTRU, an extended service request (ESR), wherein the ESR indicates a low priority for the WTRU and the ESR is related to a high priority application;
   a transceiver configured to transmit, to a wireless network, a RRC connection request with an establishment cause of mobile-originated (MO) data based on the ESR; and
   the transceiver further configured to transmit the ESR.

2. The WTRU of claim 1, wherein the RRC connection request is transmitted based on the RRC component permitting access based on a broadcasted system information block (SIB) received by the WTRU.

3. The WTRU of claim 1 further comprising:
   the processor and the transceiver are further configured to receive a broadcasted system information block (SIB) including a control parameter for each of a plurality of service types and an associated indication of access control for each of the plurality of service types.

4. The WTRU of claim 1, wherein the ESR includes a service type for an application and a priority associated with the application.

5. The WTRU of claim 1 further comprising:
   the non-access stratum (NAS) component is configured to communicate, to the RRC component, proximity services (ProSe) specific call types.

6. The WTRU of claim 5, wherein the ProSe-specific call types is ProSe Originating Call or ProSe Originating Signaling.

7. A method performed by a wireless transmit/receive unit (WTRU), the method comprising:
- receiving, by the WTRU at a radio resource control (RRC) component from a non-access stratum (NAS) component of the WTRU, an extended service request (ESR), wherein the ESR indicates a low priority for the WTRU and the ESR is related to a high priority application;
- transmitting, by the WTRU to a wireless network, a RRC connection request with an establishment cause of mobile-originated (MO) data based on the ESR; and
- transmitting, by the WTRU, the ESR.

8. The method of claim 7, wherein the RRC connection request is transmitted based on the RRC component permitting access based on a broadcasted system information block (SIB) received by the WTRU.

9. The method of claim 7 further comprising:
- receiving, by the WTRU, a broadcasted system information block (SIB) including a control parameter for each of a plurality of service types and an associated indication of access control for each of the plurality of service types.

10. The method of claim 7, wherein the ESR includes a service type for an application and a priority associated with the application.

11. The method of claim 7, wherein:
- communicating, by the NAS component of the WTRU to the RRC component, proximity services (ProSe) specific call types.

12. The method of claim 11, wherein the ProSe-specific call types is ProSe Originating Call or ProSe Originating Signaling.

* * * * *